(12) United States Patent
Nakamura

(10) Patent No.: US 8,305,450 B2
(45) Date of Patent: *Nov. 6, 2012

(54) MOBILE OBJECT IMAGE TRACKING APPARATUS

(75) Inventor: Hiroaki Nakamura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 603 days.

This patent is subject to a terminal disclaimer.

(21) Appl. No.: 12/549,448

(22) Filed: Aug. 28, 2009

(65) Prior Publication Data

US 2010/0238296 A1    Sep. 23, 2010

(30) Foreign Application Priority Data

Mar. 17, 2009    (JP) ................................. 2009-065057

(51) Int. Cl.
*H04N 5/225*    (2006.01)

(52) U.S. Cl. ...................................... 348/169; 348/103

(58) Field of Classification Search .................. 348/169; 382/103
See application file for complete search history.

(56) References Cited

U.S. PATENT DOCUMENTS

| | | | | |
|---|---|---|---|---|
| 6,072,571 A | * | 6/2000 | Houlberg | 356/139.04 |
| 7,679,733 B2 | * | 3/2010 | Carter et al. | 356/139.03 |
| 7,932,925 B2 | * | 4/2011 | Inbar et al. | 348/208.2 |
| 2011/0304736 A1 | * | 12/2011 | Evans et al. | 348/169 |

FOREIGN PATENT DOCUMENTS

| | | |
|---|---|---|
| JP | 08-321984 | 12/1996 |
| JP | 2001-133854 | 5/2001 |
| JP | 2002-314487 | 10/2002 |

* cited by examiner

*Primary Examiner* — Kevin Bates
(74) *Attorney, Agent, or Firm* — Turocy & Watson, LLP

(57) ABSTRACT

A mobile object image tracking apparatus includes: a base; a first gimbal; a second gimbal; an image guiding passage configured to guide an image received through an input opening portion of the second gimbal to the base; an image capturing device; an angle sensor; a tracking error detector configured to detect a first tracking error of an image data; a delay circuit; a tracking error calculator configured to calculate a second tracking error based on the first tracking error, a delayed first rotation angle, and a delayed second rotation angle; an angular velocity processor configured to generate a first target angular velocity and a second target angular velocity based on the first rotation angle, the second rotation angle, and the second tracking error; and an actuator controller configured to control the first gimbal the second gimbal based on the first and second target angular velocities.

4 Claims, 11 Drawing Sheets

MOBILE OBJECT IMAGE TRACKING APPARATUS

CROSS-REFERENCE TO THE RELATED APPLICATION(S)

The present disclosure relates to the subject matters contained in Japanese Patent Application No. 2009-065057 filed on Mar. 17, 2009, which are incorporated herein by reference in its entirety.

FIELD

The present invention relates to a mobile object image tracking apparatus that tracks a target that moves in a wide range using a target recognition sensor such as a camera.

BACKGROUND

In recent years, in security equipment used in large-scale facilities such as airports and plants and lifeline-related facilities such as power plants and water service facilities and in traffic information assist systems such as ITSs (intelligent transport systems), many systems have been put on the market which track a target using an ITV (industrial television) camera or the like to thereby continuously monitor the target and acquire detailed information. Assuming not only ground-installation-type uses but also uses with platforms of automobiles, ships, airplanes, etc., these systems have compact, earthquake-resistant structures and are capable of suppressing disturbance such as vibration or a jolt. Furthermore, it is now important that the turning speed be sufficiently high and the system be capable of being directed to a target in a short time so that plural targets can be traced sequentially.

To track a target that moves in a wide range, such mobile object image tracking systems in many cases employ a gimbal structure having at least two rotation axes. In this case, image tracking control is performed so that a feature point of a mobile object in an image taken by a camera that is provided in a gimbal movable unit is aligned with the center of the camera. An example of such configuration is disclosed in JP-A-8-321984.

In the above technique, since the camera is provided in the gimbal movable unit, miniaturization of the system is difficult and the load inertia is large. As a result, it is difficult to track a mobile object that moves at high speed. Furthermore, high-speed tracking requires high motor performance.

One solution for solving the above problems is to dispose the camera outside, rather than inside, the movable unit. Examples of such solution are disclosed in JP-A-2001-133854 (counterpart U.S. publication is: U.S. Pat. No. 6,927,905 B1) and in JP-A-2002-314487.

However, the devices disclosed in the documents JP-A-2001-133854 and JP-A-2002-314487 are associated with a problem that an image taken by the camera provided outside the movable unit is rotated depending on the directions of a gimbal front face and the light incident surface of a camera optical system that includes mirrors and is rotated about the optical axis.

SUMMARY

According to an aspect of the invention, there is provided a mobile object image tracking apparatus including: a base; a first gimbal provided on the base to be rotatable with respect to the base, the first gimbal having an opening; a second gimbal provided in the opening of the first gimbal to be rotatable with respect to the first gimbal, the second gimbal being formed with an input opening portion that receives an image of a mobile object being set as a tracking target; an image guiding passage configured to guide the image that is received through the input opening portion of the second gimbal to the base through the second gimbal and the first gimbal; an image capturing device provided in the base, the image capturing device being configured to capture the image guided by the image guiding passage and output image data; an angle sensor configured to detect a first rotation angle of the first gimbal and a second rotation angle of the second gimal; a tracking error detector configured to extract feature points from a plurality of the image data output from the image capturing device and detect a first tracking error of the image data based on the feature points; a delay circuit configured to delay the first rotation angle and the second rotation angle and output a delayed first rotation angle and a delayed second rotation angle; a tracking error calculator configured to calculate a second tracking error based on the first tracking error, the delayed first rotation angle, and the delayed second rotation angle; an angular velocity processor configured to generate a first target angular velocity for the first gimbal and a second target angular velocity for the second gimbal based on the first rotation angle, the second rotation angle, and the second tracking error; and an actuator controller configured to control a first actuation of the first gimbal based on the first target angular velocity and control a second actuation of the second gimbal based on the second target angular velocity.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION OF THE EMBODIMENTS

Figure 1:
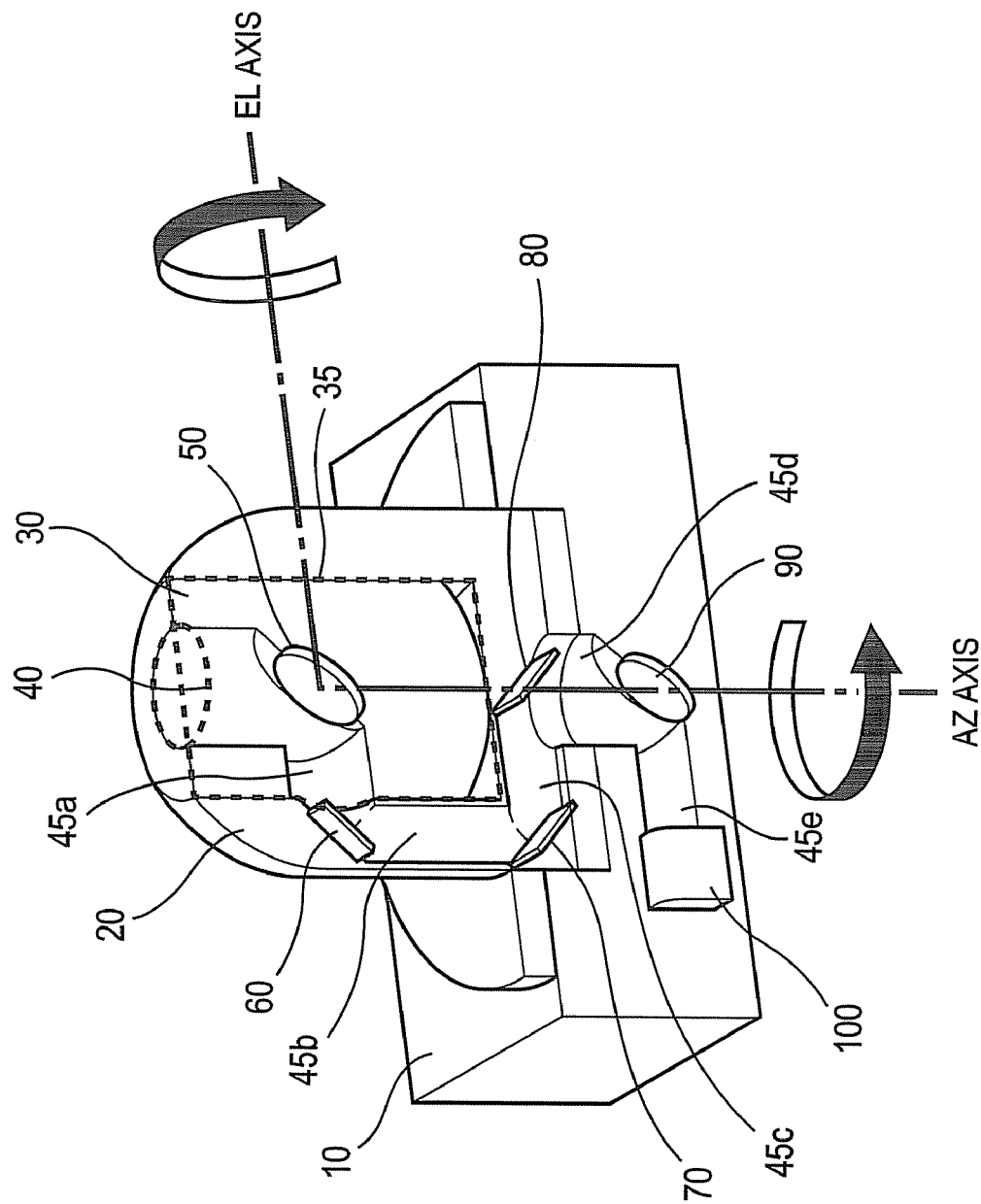
FIG. 1 is a partially sectional view of a mobile object image tracking apparatus according to a first embodiment of the present invention.

Hereinafter, embodiments of the invention will be described with reference to the drawings. In the following description, the same or similar components will be denoted by the same reference numerals, and the duplicate description thereof will be omitted.

First Embodiment

Figure 2:
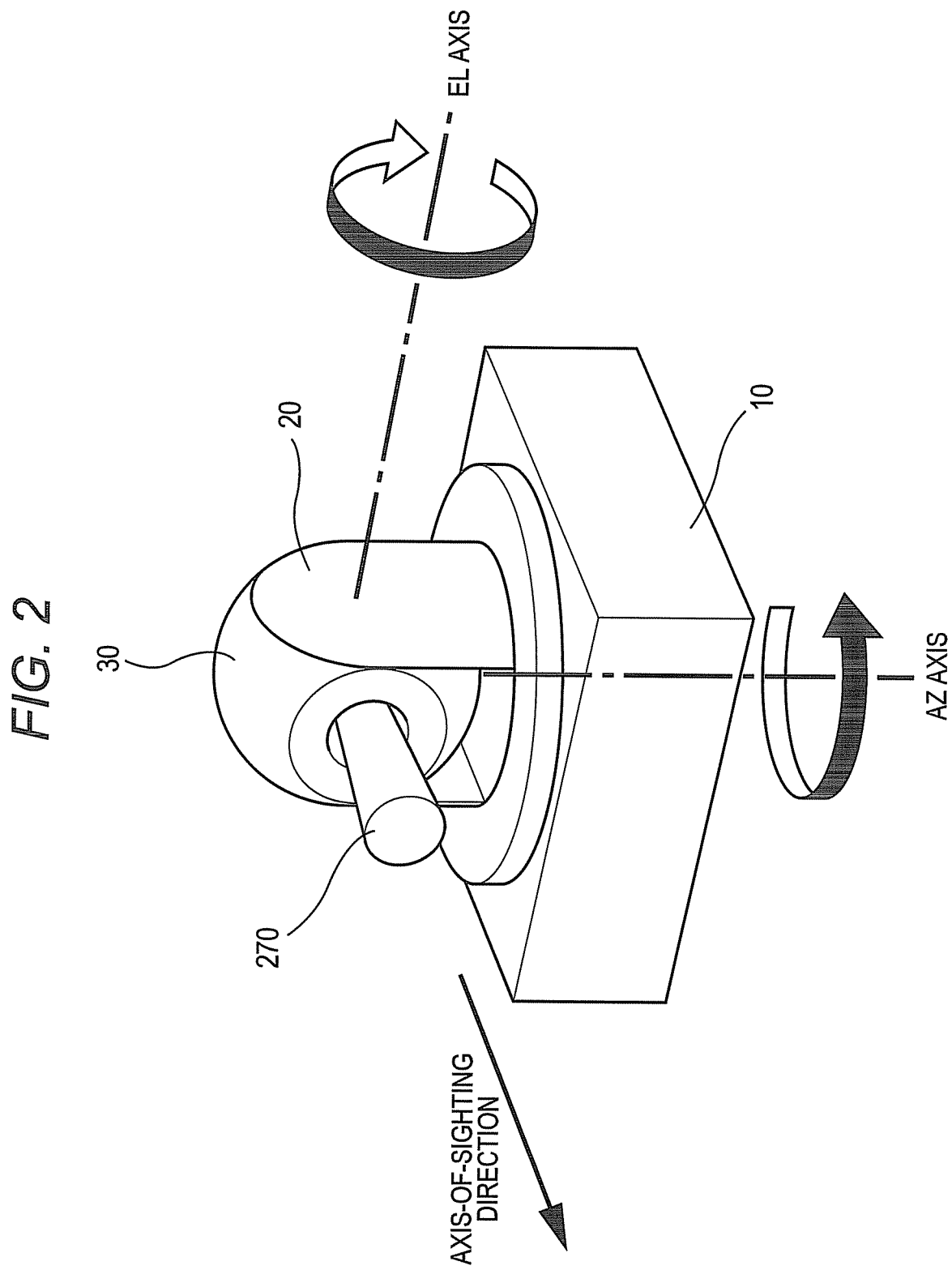
FIG. 2 shows an appearance of the mobile object image tracking apparatus according to the first embodiment.

FIGS. 1 and 2 show the configuration of a mobile object image tracking apparatus according to a first embodiment of the present invention. FIG. 1 is a partially sectional view of the mobile object image tracking apparatus according to the first embodiment. FIG. 2 shows an appearance of the mobile object image tracking apparatus according to the first embodiment.

In the mobile object image tracking apparatus according to this embodiment, a camera 100 as an image capturing device is mounted in a base 10 having a rectangular parallelepiped shape. The bottom portion of a turnable, generally cylindrical first gimbal 20 is also mounted in the base 10. The first gimbal 20 has an opening 35 and is disposed in such a manner that its generally cylindrical side wall is perpendicular to the base 10. A second gimbal 30 which has a generally cylindrical shape with a round bottom portion and is formed with a circular input opening portion 40 is inserted in the opening 35 of the first gimbal 20 so as to be able to turn about an horizontal axis. More specifically, the second gimbal 30 is inserted in the opening 35 of the first gimbal 20 in such a manner that the inner side surface of the first gimbal 20 is parallel with the outer side surface of the second gimbal 30 and that the center of the circular input opening portion 40 of the second gimbal 30 is aligned with the center line of the generally cylindrical first gimbal 20. The term "to turn" means to make circular motion in both of the normal and reverse directions. The first gimbal 20 is rotated (makes circular motion in one direction) until detection of a tracking target. The first gimbal 20 is turned after detection of the tracking target.

The side surfaces of the two generally cylindrical shapes of the first gimbal 20 are perpendicular to the base 10, and the first gimbal 20 has an azimuth axis (AZ axis) which is a rotation axis passing through the center of its circular bottom surface. The first gimbal 20 can rotate freely about the azimuth axis.

On the other hand, the second gimbal 30 has, as a rotation axis, an elevation axis (EL axis) which is perpendicular to the azimuth axis. The second gimbal 30 can turn freely about the elevation axis. It is desirable that the elevation axis pass through the center of gravity of the second gimbal 30.

Having the above structure, the mobile object image tracking apparatus is configured so that monitoring image is input through the input opening portion 40 and guided to the camera 100 which is mounted in the base 10. To this end, the center of the circular input opening portion 40 is aligned with the azimuth axis which is the rotation axis of the first gimbal 20. However, the advantages of the embodiment can be obtained even if the center of the circular input opening portion 40 is not aligned with the azimuth axis. An image guide passage 45 for guiding monitoring image from the input opening portion 40 to the camera 100 is formed in the path extending from the input opening portion 40 to the camera 100. More specifically, the image-carrying light guide passage 45 has a bent cylinder shape whose cross section has the same shape as the input opening portion 40, and monitoring image is guided to the camera 10 being reflected by, for example, five mirrors provided in internal passages 45a-45e formed in the first gimbal 20 and the second gimbal 30.

The monitoring image entering through the input opening portion 40 passes through the light input portion of the image-carrying light guide passage 45 whose center axis coincides with the azimuth axis, and is reflected so as to travel along the elevation axis by a first mirror 50 which is disposed in the second gimbal 30 at the position where the azimuth axis and the elevation axis intersect each other. That is, the first mirror 50 is turned following a turn of the second gimbal 30.

The monitoring image reflected by the first mirror 50 passes through the first passage 45a which is formed in such a manner that its center axis coincides with the elevation axis, and is reflected toward the base 10 by a second mirror 60 which is disposed in the side wall of the first gimbal 20.

The monitoring image reflected by the second mirror 60 passes through the second passage 45b which is formed in the first gimbal 20 perpendicularly to the base 10, and is reflected by a third mirror 70 which is disposed in the bottom portion of the first gimbal 20 toward the azimuth axis so as to travel parallel with the elevation axis.

The monitoring image reflected by the third mirror 70 passes through the third passage 45c which is formed in the bottom portion of the first gimbal 20 perpendicularly to the azimuth axis (i.e., parallel with the elevation axis), and is reflected by a fourth mirror 80 which is disposed on the azimuth axis so as to travel downward along the azimuth axis.

The monitoring image reflected by the fourth mirror 80 passes through the fourth passage 45d which is formed along the azimuth axis, and is reflected by a fifth mirror 90 which is disposed in the base 10.

Finally, the monitoring image reflected by the fifth mirror 90 passes through the fifth passage 45e, which is formed in the base 10 so as to extend toward the camera 100 which is mounted in the base 10, and irradiates on and is detected by the camera 10. The passages 45c and 45d are formed so as to be separated from each other at the interface between the first gimbal 20 and the base 10.

FIG. 2 shows the mobile object image tracking apparatus in a state that the second gimbal 30 is rotated by 90 degrees about the elevation axis from the state of FIG. 1.

As shown in FIG. 2, the mobile object image tracking apparatus according to the embodiment can move flexibly using the two axes, that is, the azimuth axis and the elevation axis.

Figure 3:
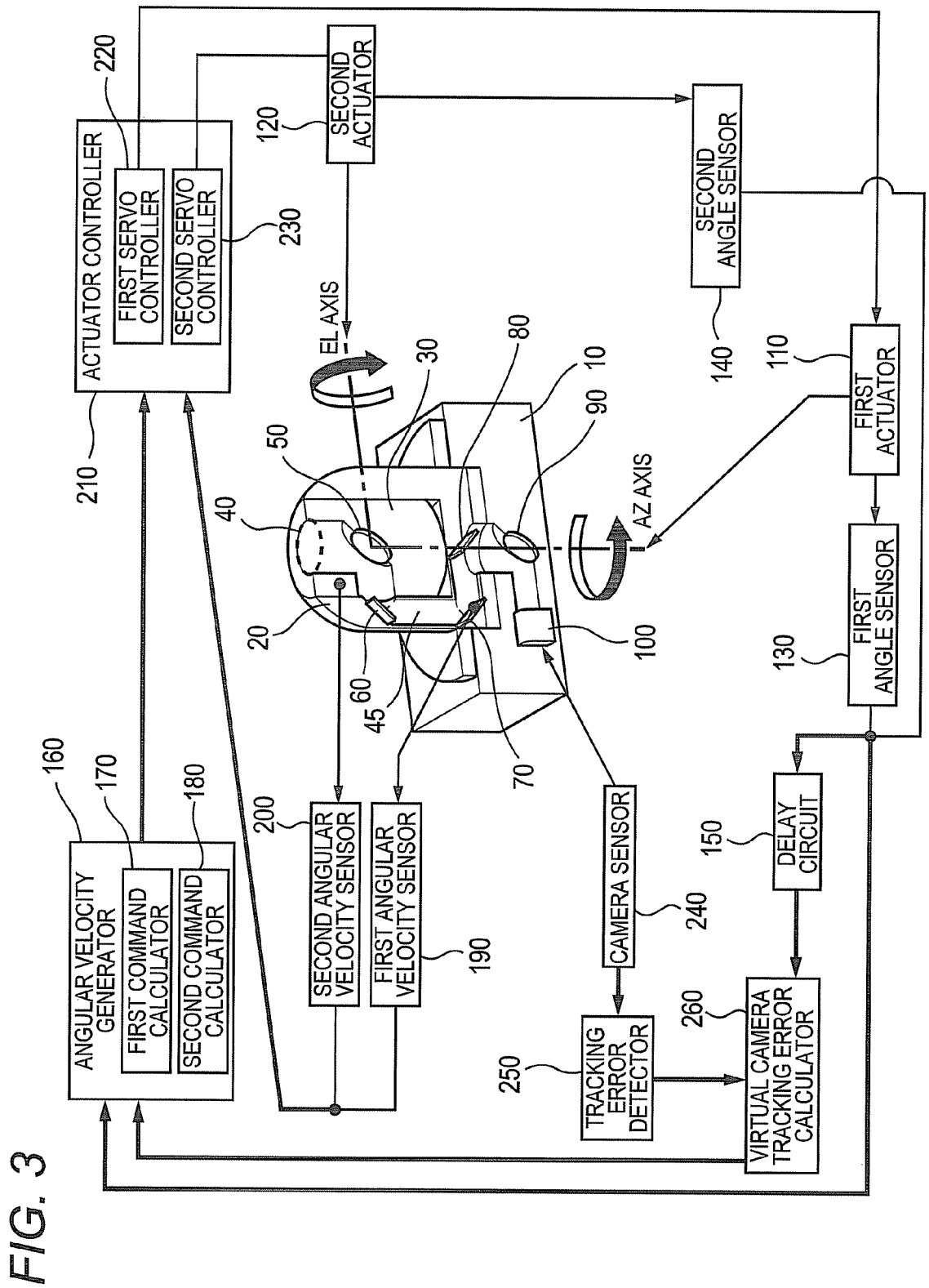
FIG. 3 shows a detailed configuration of a control section of the mobile object image tracking apparatus according to the first embodiment.

Next, the mobile object image tracking apparatus according to the embodiment will be described in more detail with reference to FIG. 3.

As described above, in the mobile object image tracking apparatus according to the embodiment, the first gimbal 20 is rotated with the azimuth as the rotation axis. The rotary shaft of a drive motor (not shown) for causing this rotation is provided in the first gimbal 20, and the rotation of the first gimbal 20 is controlled by a first actuator unit 110. On the other hand, the second gimbal 30 is turned with the elevation axis as the rotation axis by a motor (not shown) which is provided in the second gimbal 30, and the turning of the second gimbal 30 is controlled by a second actuator unit 120.

The first actuator unit 110 is connected to a first angle sensor 130 for detecting a rotation angle of the first gimbal 20. The second actuator unit 120 is connected to a second angle sensor 140 for detecting a rotation angle of the second gimbal 30.

The first angle sensor 130 and the second angle sensor 140 are connected to a delay circuit 150 which receives rotation angle information detected by each of the first angle sensor 130 and the second angle sensor 140 and outputs delayed rotation angle information and to an angular velocity processor 160 which generates angular velocity command values to be used for determining angular velocities for the first gimbal 20 and the second gimbal 30.

The angular velocity processor 160 includes a first command calculator 170 for generating an angular velocity command value for the first gimbal 20 and a second command calculator 180 for generating an angular velocity command value for the second gimbal 30.

A first angular velocity sensor 190 for detecting a rotation angular velocity of the first gimbal 20 is disposed in the vicinity of the third mirror 70 which is disposed in the first gimbal 20. A second angular velocity sensor 200 for detecting a rotation angular velocity of the second gimbal 30 is disposed in the vicinity of the input opening portion 40 of the second gimbal 30. The angular velocity sensors 190 and 200 may be commonly used rate gyro sensors or the like.

The first angular velocity sensor 190 and the second angular velocity sensor 200 are connected to a actuator controller 210. Each of the first angular velocity sensor 190 and the second angular velocity sensor 200 transfers acquired angular velocity information to the actuator controller 210.

Also connected to the angular velocity processor 160, the actuator controller 210 receives the angular velocity command values for the first gimbal 20 and the second gimbal 30 generated by the angular velocity processor 160.

The actuator controller 210 includes a first servo controller 220 and a second servo controller 230 for controlling the first actuator unit 110 and the second actuator unit 120, respectively. The first servo controller 220 controls the first actuator unit 110 based on the angular velocity information acquired by the first angular velocity sensor 190 and the angular velocity command value that is output from the first command calculator 170. The second servo controller 230 controls the second actuator unit 120 based on the angular velocity information acquired by the second angular velocity sensor 200 and the angular velocity command value that is output from the second command calculator 180.

The camera 100 is provided with a camera sensor 240. The camera sensor 240 acquires image data of an image taken by the camera 100.

The image data acquired by the camera sensor 240 is converted into a black-and-white image through binarization by a tracking error detector 250 which is connected to the camera sensor 240. A feature point of a mobile object image that is detected by the mobile object image tracking apparatus is extracted from the black-and-white image, whereby a position in the field of view of the camera 100 is recognized and deviations (first tracking errors) from the center of the field of view in two directions are employed as tracking error detection values.

The processing time including the time taken by the above image processing is a sampling time during which to obtain tracking error detection values. That is, a certain delay occurs in acquiring tracking error detection values.

The tracking error detector 250 is connected to a virtual camera tracking error calculator 260 (also called a tracking error calculator).

The virtual camera tracking error calculator 260 is also connected to the delay circuit 150 and the angular velocity processor 160. That is, the virtual camera tracking error calculator 260 performs a calculation on the image data acquired from the camera sensor 240 using the tracking error detection values in the two directions transferred from the tracking error detector 250 and the pieces of delayed angle information transferred from the delay circuit 150, and transfers a calculation result to the angular velocity processor 160. The term "delayed angle information" means angle information obtained earlier by a length of delay that occurs when the tracking error detector 250 generates tracking error detection values. The term "virtual camera" means a camera that looks as if it detected image-carrying light that is incident on the input opening portion 40.

Next, a detailed description will be made of a detection method of the tracking error detector 250.

Figure 4:
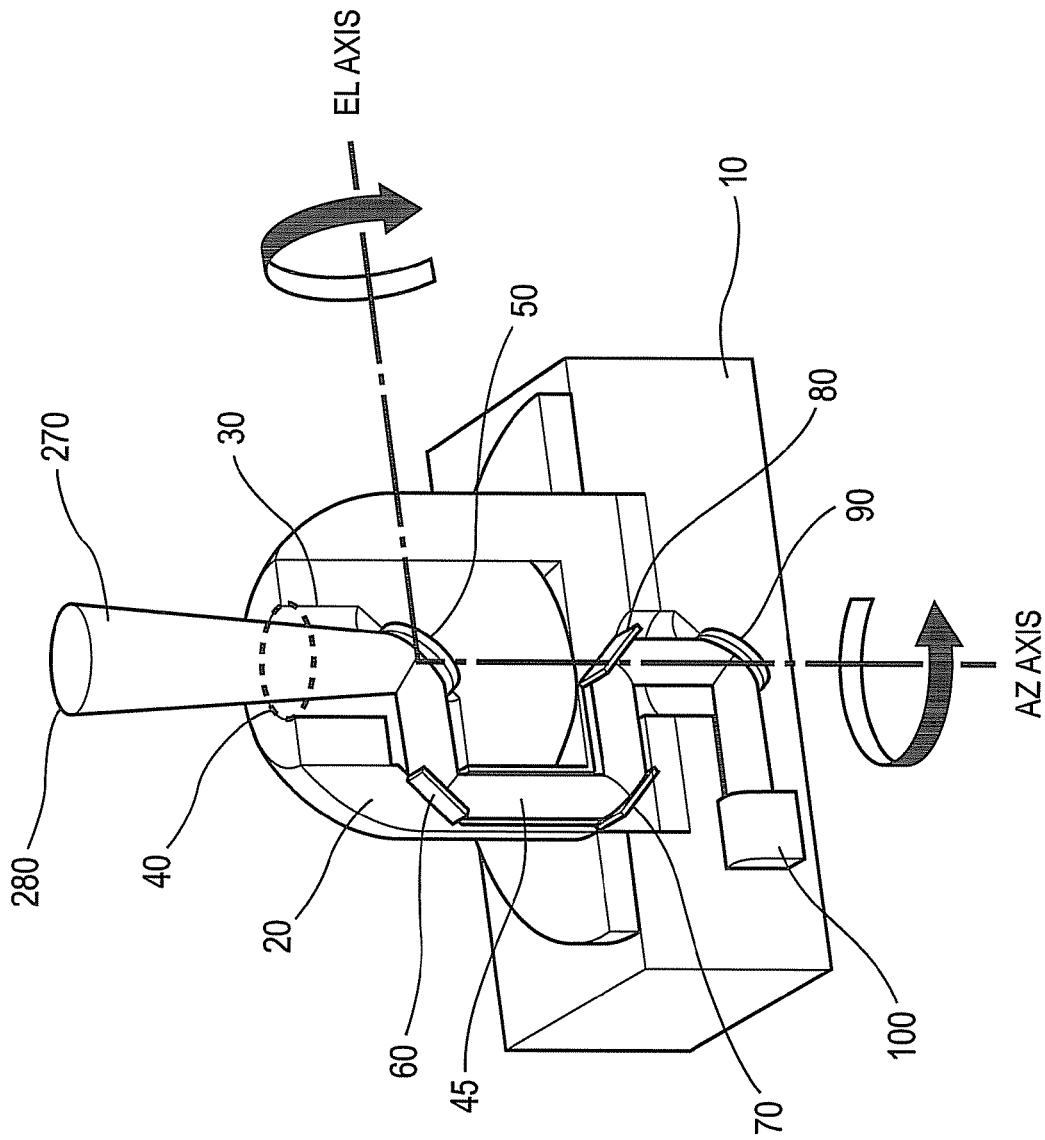
FIG. 4 shows the mobile object image tracking apparatus according to the first embodiment in a first operation state.
Figure 5:
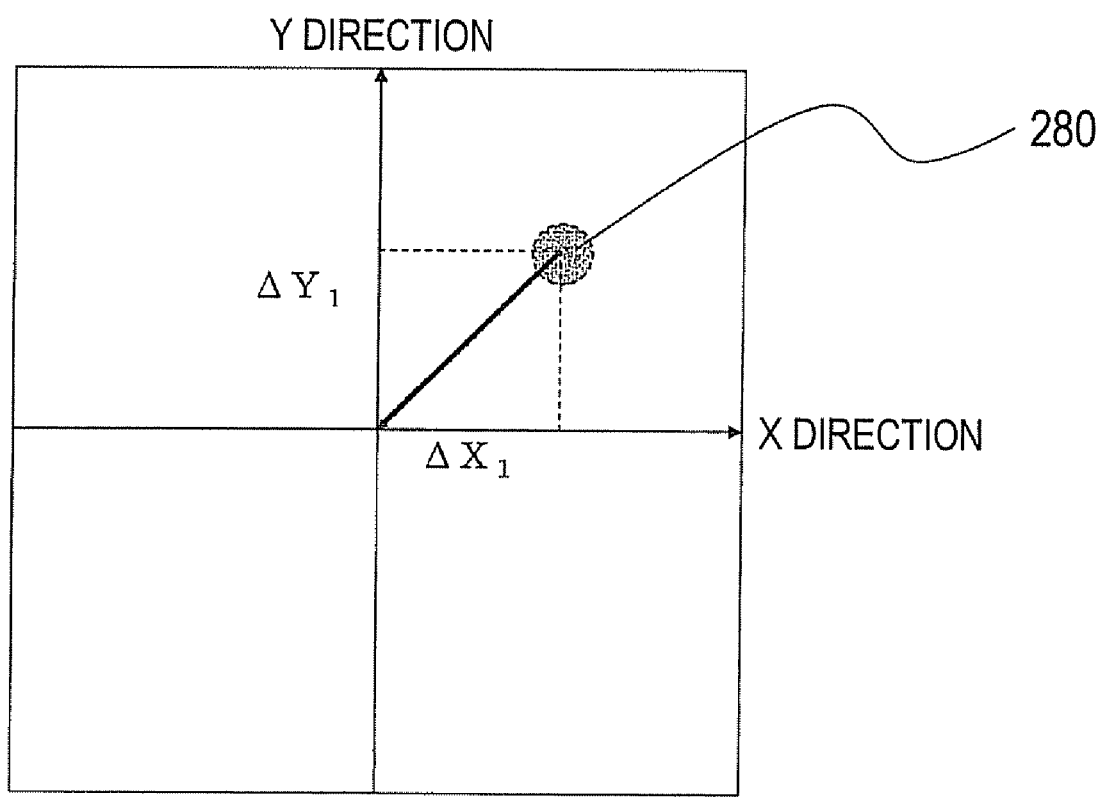
FIG. 5 shows an image that has been taken by a camera and processed by a tracking error detector and corresponds to the first operation state.

FIG. 4 shows the mobile object image tracking apparatus in a state that the rotation angle of the first gimbal 20 about the azimuth axis is 0 degree. FIG. 5 shows an image that has been taken by the camera 100 and processed by the tracking error detector 250 in the state of FIG. 4.

FIG. 4 shows a field of view 270 which is a shooting-possible range of the camera 100 and a mobile object 280 that is located in the field of view 270. The mobile object 280 may be either an object that is moving or an object that is standing still.

As shown in FIG. 4, when the mobile object 280 in the field of view 270 is being shot by the camera 100, the tracking error detector 250 generates tracking error detection values ($\Delta X_1$, $\Delta Y_1$) indicating a deviation from the center of the camera 100.

Figure 6:
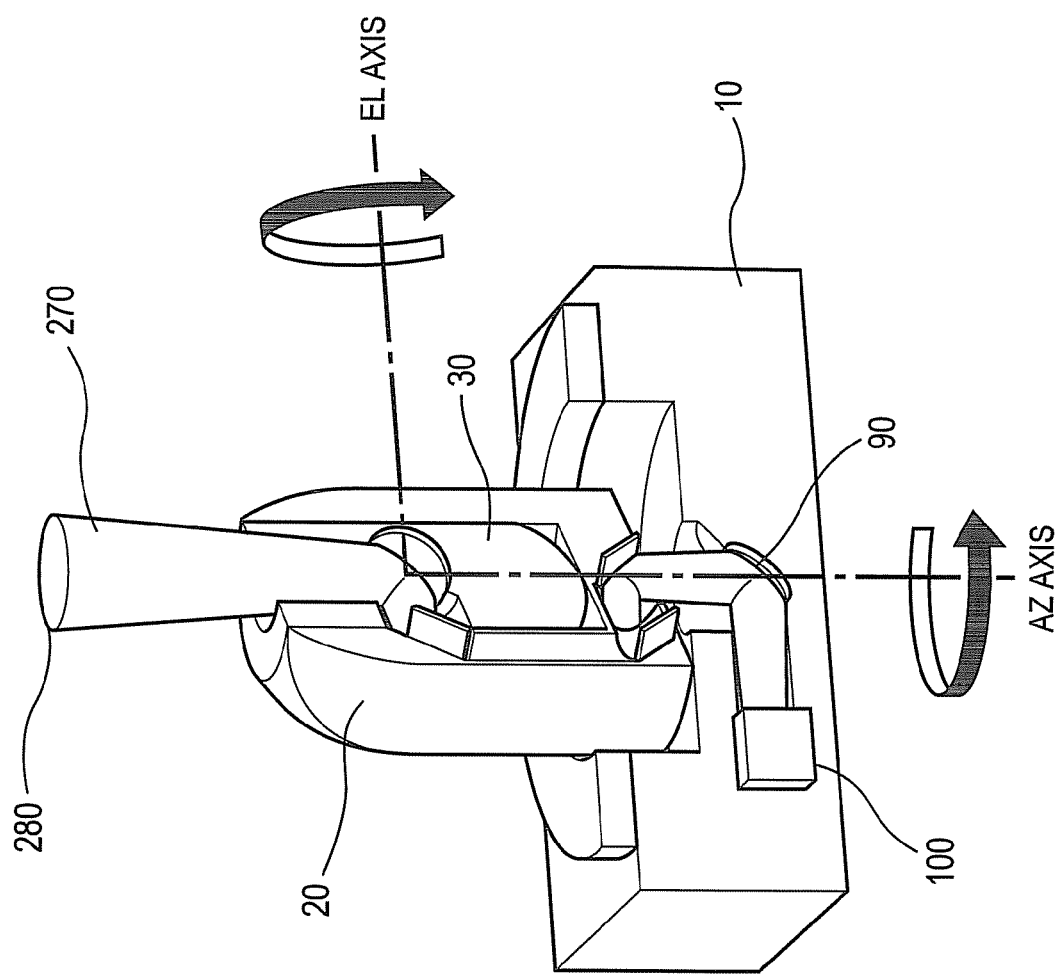
FIG. 6 shows the mobile object image tracking apparatus according to the first embodiment in a second operation state.
Figure 7:
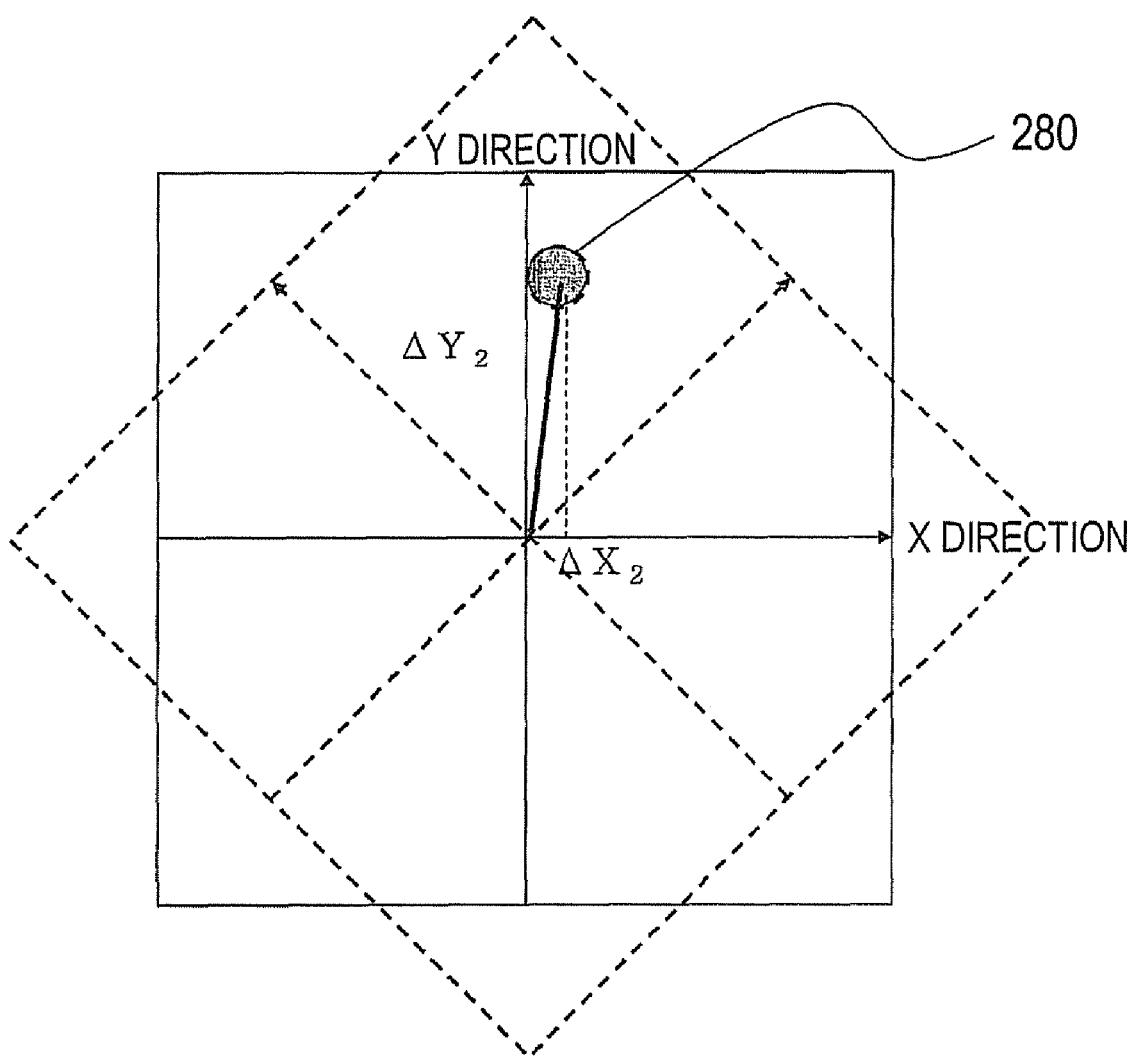
FIG. 7 shows an image that has been taken by the camera and processed by the tracking error detector and corresponds to the second operation state.

FIG. 6 shows the mobile object image tracking apparatus in a state that the first gimbal 20 is rotated about the azimuth axis by 45 degrees from the state of FIG. 4. FIG. 7 shows an image that has been taken by the camera 100 and processed by the tracking error detector 250 in the state of FIG. 6.

As shown in FIG. 6, where the camera 100 is shooting with an assumption that the mobile object 280 is located in the field of view 270, the tracking error detector 250 generates tracking error detection values ($\Delta X_2$, $\Delta Y_2$) indicating a deviation from the center of the camera 100 (see FIG. 7). The values ($\Delta X_2$, $\Delta Y_2$) are different from the values ($\Delta X_1$, $\Delta Y_1$) obtained in the state of FIG. 4. That is, the tracking error detection values detected through the camera 100 vary though no turn of the second gimbal 30 is made about the elevation axis. This is because an image rotation is caused by the first to fifth mirrors 50-90 which are disposed in the first gimbal 20 and the second gimbal 30.

A rotation of an image taken by the camera 100 is likewise caused by the mirrors 50-90 when the second gimbal 30 is turned about the elevation axis.

As described above, the tracking error detection values detected through the camera 100 vary according to a rotation or a turn about the azimuth axis or the elevation axis.

Next, a tracking control system for coping with the above phenomenon will be described with reference to FIG. 8.

Figure 8:
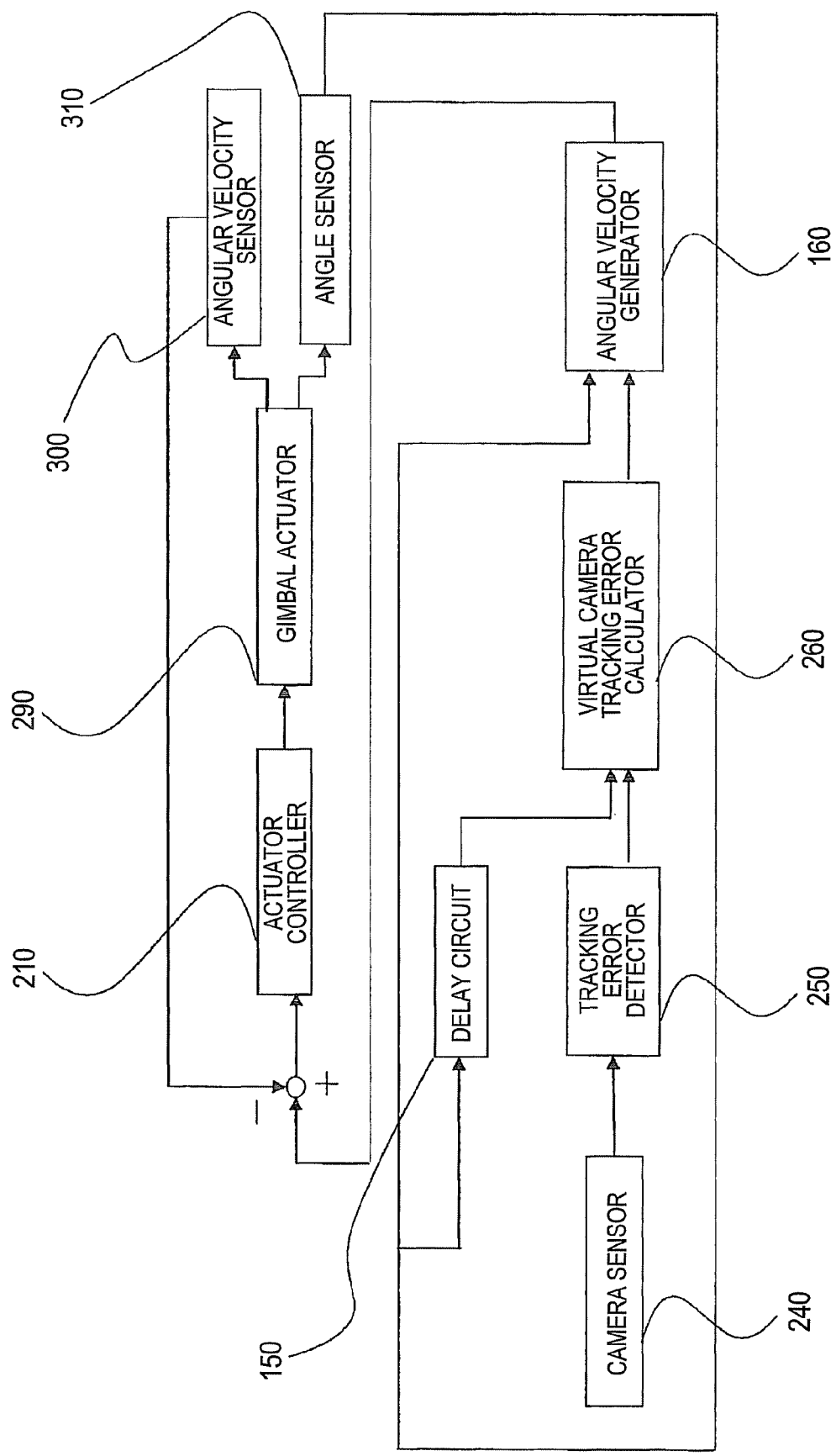
FIG. 8 is a block diagram of a control system, capable of coping with rotational variations of tracking error detection values, of the mobile object image tracking apparatus according to the first embodiment.

FIG. 8 is a block diagram of a tracking control system in which sections corresponding to the azimuth axis and sections corresponding to the elevation axis are expressed together.

A gimbal actuator unit 290 represents the first actuator unit 110 and the second actuator unit 120 combined. An angular velocity sensor 300 represents the first angular velocity sensor 190 and the second angular velocity sensor 200 combined. An angle sensor 310 represents the first angle sensor 130 and the second angle sensor 140 combined.

The virtual camera tracking error calculator 260 calculates virtual camera tracking error detection values (second tracking errors) that would be detected through a virtual camera that is virtually disposed in the vicinity of the input opening portion 40 of the second gimbal 30 based on angle data corresponding to detected angles of the first gimbal 20 and the second gimbal 30 and tracking error detection values obtained through the camera sensor 240.

The relationship between the X/Y tracking errors ($\Delta X_f$, $\Delta Y_f$) detected through the camera 100 and the virtual X/Y tracking errors ($\Delta X_j$, $\Delta Y_j$) that would be detected through the virtual camera is given by Equation (1) which represents a coordinate conversion that reflects the rotation angles ($\theta_1$, $\theta_2$) about the azimuth angle and the elevation angle which are detected by the angle sensor 310, that is, the first angle sensor 130 and the second angle sensor 140, respectively:

$$\begin{bmatrix} \Delta X_f \\ \Delta Y_f \end{bmatrix} = rotCM \times rotAZ \times rotEL \times \begin{bmatrix} \Delta X_j \\ \Delta Y_j \end{bmatrix} \qquad (1)$$

The individual coordinate matrices in Equation (1) are given by the following Equations (2)-(4):

$$rotEL = \begin{bmatrix} \cos\theta_2 & -\sin\theta_2 \\ \sin\theta_2 & \cos\theta_2 \end{bmatrix} \qquad (2)$$

$$rotAZ = \begin{bmatrix} \cos\theta_1 & -\sin\theta_1 \\ \sin\theta_1 & \cos\theta_1 \end{bmatrix} \qquad (3)$$

$$rotCM = \begin{bmatrix} -1 & 0 \\ 0 & 1 \end{bmatrix} \begin{bmatrix} \cos(\pi/2) & -\pi/2 \\ \sin(\pi/2) & \cos(\pi/2) \end{bmatrix} \qquad (4)$$

Therefore, through an inverse coordinate conversion, the virtual tracking errors ($\Delta X_j$, $\Delta Y_j$) that would be detected through the virtual camera which is virtually located in the vicinity of the input opening portion 40 of the second gimbal 30 are given by the following Equation (5) as a function of the tracking errors ($\Delta X_f$, $\Delta Y_f$) detected through the camera 100:

$$\begin{bmatrix} \Delta X_j \\ \Delta Y_j \end{bmatrix} = (rotCM \times rotAZ \times rotEL)^{-1} \times \begin{bmatrix} \Delta X_f \\ \Delta Y_f \end{bmatrix} \qquad (5)$$

The inverse coordinate conversion matrix is given by the following Equation (6):

$$(rotCM \times rotAZ \times rotEL)^{-1} = \qquad (6)$$
$$\begin{bmatrix} \cos\theta_{AZ}\sin\theta_{EL} + \sin\theta_{AZ}\cos\theta_{EL} & \cos\theta_{AZ}\cos\theta_{EL} - \sin\theta_{AZ}\sin\theta_{EL} \\ \cos\theta_{AZ}\cos\theta_{EL} - \sin\theta_{AZ}\sin\theta_{EL} & -\cos\theta_{AZ}\sin\theta_{EL} - \sin\theta_{AZ}\cos\theta_{EL} \end{bmatrix}$$

Rearranging Equation (5), we obtain the following simplified Equation (7):

$$\begin{cases} \Delta X_j = \sin(\theta_1 + \theta_2)\Delta X_f + \cos(\theta_1 + \theta_2)\Delta Y_f \\ \Delta Y_j = \cos(\theta_1 + \theta_2)\Delta X_f - \sin(\theta_1 + \theta_2)\Delta Y_f \end{cases} \qquad (7)$$

The tracking errors ($\Delta X_f$, $\Delta Y_f$) detected through the camera 100 have a delay due to the image processing performed in the tracking error detector 250. The angles ($\theta_1$, $\theta_2$), which can also be used for the gimbal direction control based on angles, are sampled at a higher rate than in the sampling of the tracking error detector 250. In the virtual camera tracking error calculation by the virtual camera tracking error calculator 260, the tracking errors and the angles should be pieces of information of the same time point. Whereas the virtual camera tracking error calculation of Equation (7) is not affected very much by the delay when the mobile object 280 moves slowly, it is affected to a large extent by the delay when the mobile object 280 moves fast.

In view of the above, in the embodiment, the angle data are input to the virtual camera tracking error calculator 260 after being delayed by the delay circuit 150 by the same time as the delay of the tracking error detector 250. Where the mobile object image tracking apparatus is not provided with the delay circuit 150, it is not necessary to provide the virtual camera tracking error calculator 260, in which case the tracking errors as processed by the tracking error detector 250 are transferred directly to the angular velocity processor 160. This merely causes a certain delay.

The angular velocity processor 160 generates angular velocity command values ($\theta_{r1}$, $\theta_{r2}$) to be used for driving the first gimbal 20 and the second gimbal 30 to track the mobile object 280, based on the tracking errors in the two directions acquired from the virtual camera tracking error calculator 260 and the angles ($\theta_1$, $\theta_2$) detected by the angle sensor 310. One method for distributing angular velocities to the azimuth axis and the elevation axis (two axes) based on tracking errors ($\Delta X$, $\Delta Y$) in the two directions is represented by Equation (8) which correlates the angular velocity command values with the tracking errors:

$$\begin{bmatrix} \theta_{r1} \\ \theta_{r2} \end{bmatrix} = K_c \begin{bmatrix} -\sec\theta_2 & 0 \\ 0 & 1 \end{bmatrix} \begin{bmatrix} \Delta X \\ \Delta Y \end{bmatrix} \qquad (8)$$

In Equation (8), Kc represents the tracking gain and $\sec\theta_2$, which is the secant function of $\theta_2$ and becomes infinite at 90 degrees. Therefore, good care should be taken of the fact that a command of a very large angular velocity is generated when the mobile object 180 is located at or near the zenith.

As described above, the embodiment makes it possible to track a mobile object 280 using virtual camera tracking error detection values that would be detected through the virtual camera that is virtually disposed in the vicinity of the opening input section 40 of the second gimbal 30 by performing a virtual camera tracking error calculation. Furthermore, since the camera 100 is not provided in the first gimbal 20 or the second gimbal 30, the embodiment allows the first gimbal 20 and the second gimbal 30 to move quickly.

Second Embodiment

Figure 9:
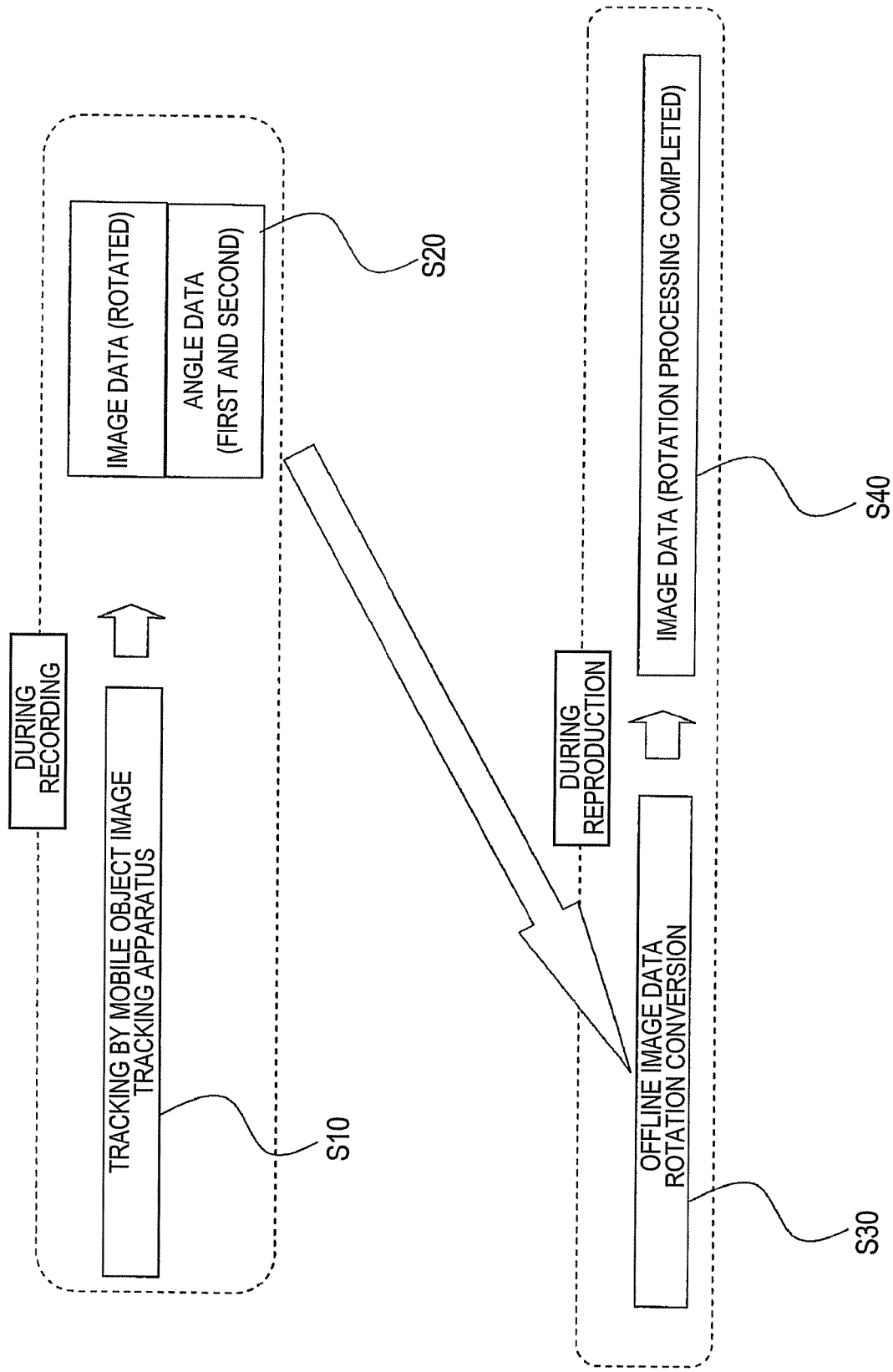
FIG. 9 shows a control operation of a mobile object image tracking apparatus according to a second embodiment of the invention.

FIG. 9 shows a control operation of a mobile object image tracking apparatus according to a second embodiment.

In the mobile object image tracking apparatus according to this embodiment, recording and reproduction of image data are performed together with image tracking of a mobile object. As described in the first embodiment, when a mobile object 280 is tracked to thereby monitor it continuously and acquire detailed information, an image taken by the camera 100 is rotated if image tracking of the mobile object 280 is performed by using the camera 100 itself.

Therefore, if it is attempted to handle an image taken by the camera 100 as it is, necessary monitoring information cannot be obtained due to the image rotation.

To eliminate the influence of the image rotation, processing should be performed after taking an image with the virtual camera that is virtually located in the vicinity of the opening input section 40 of the second gimbal 30. However, in this case, the image processing takes time to lower the tracking performance.

A technique capable of solving the above problem is available in which a rotary mechanism is also provided in the image shooting unit and rotating the light-receiving unit according to rotation of the optical system that is caused by a rotation and a turn of the gimbals. However, this technique is associated with a problem that the number of mechanical components is increased and hence the control is made more complicated and the apparatus cost is increased.

In view of the above, in the embodiment, whereas the sampling time of the image tracking control is kept as it is, a recorder is provided which records image data and pieces of angle information of the first gimbal 20 and the second gimbal 30 simultaneously.

As shown in FIG. 9, first, at step S10, the mobile object image tracking apparatus tracks a mobile object 280.

At step S20, while the mobile object 280 is tracked, angle data are acquired by the angle sensor 310 at the same time as image data of the mobile object 280 is acquired by the camera 100. The image data and the angle data are recorded in the recorder (not shown) which is provided in the mobile object image tracking apparatus. An image taken by the camera 100 is affected by a rotation of the mirrors 50-90 which are provided in the first gimbal 20 and the second gimbal 30.

When the acquired image data is reproduced, the mobile object image tracking apparatus continues to track the mobile object 280. At step S30, image data rotation conversion processing is performed offline based on the image data and the angle data acquired at step S20. Finally, at step S40, a rotated-corrected image is obtained as a result of the processing of step S30.

As described above, this embodiment makes it possible to obtain the same image data as obtained by a conventional apparatus in which the camera 100 is provided in the second gimbal 30. Furthermore, since angle data are recorded with the image, an image obtained when the mobile object image tracking apparatus was directed to a certain direction (which depends on its installation location) can be found.

Third Embodiment

Figure 10:
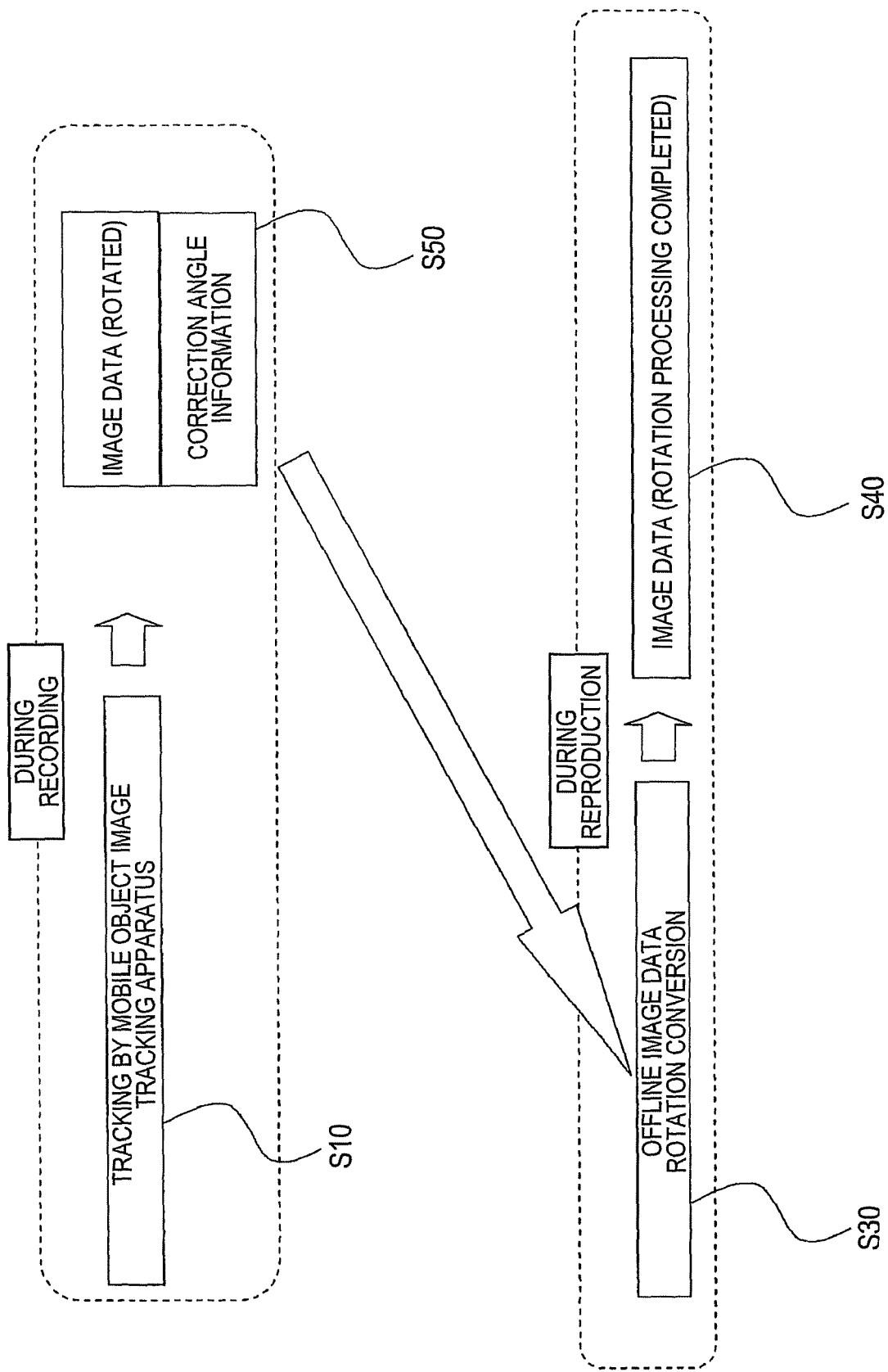
FIG. 10 shows a control operation of a mobile object image tracking apparatus according to a third embodiment of the invention.

FIG. 10 shows a control operation of a mobile object image tracking apparatus according to a third embodiment.

In the mobile object image tracking apparatus according to this embodiment, as in the second embodiment, recording and reproduction of image data are performed together with image tracking of a mobile object.

The data recording and reproduction of the mobile object image tracking apparatus according to this embodiment are different than in the second embodiment in that the mobile object image tracking apparatus records, together with image data, an image data correction angle of image data rotation conversion that is determined by an angle of the first gimbal 20 (step S50). When the recorded image data is reproduced, the image data is subjected to image data rotation conversion processing (offline processing) based on the image data correction angle information (step S30). This makes it possible to obtain rotation-corrected image data without lowering the image tracking performance.

As described above, in the third embodiment, only an image data correction angle is recorded together with image data and used for image data rotation conversion during reproduction. Therefore, the same image data as obtained by a conventional apparatus in which the camera 100 is fixed to the second gimbal 30 can be obtained while the amount of recorded information is reduced.

Fourth Embodiment

Figure 11:
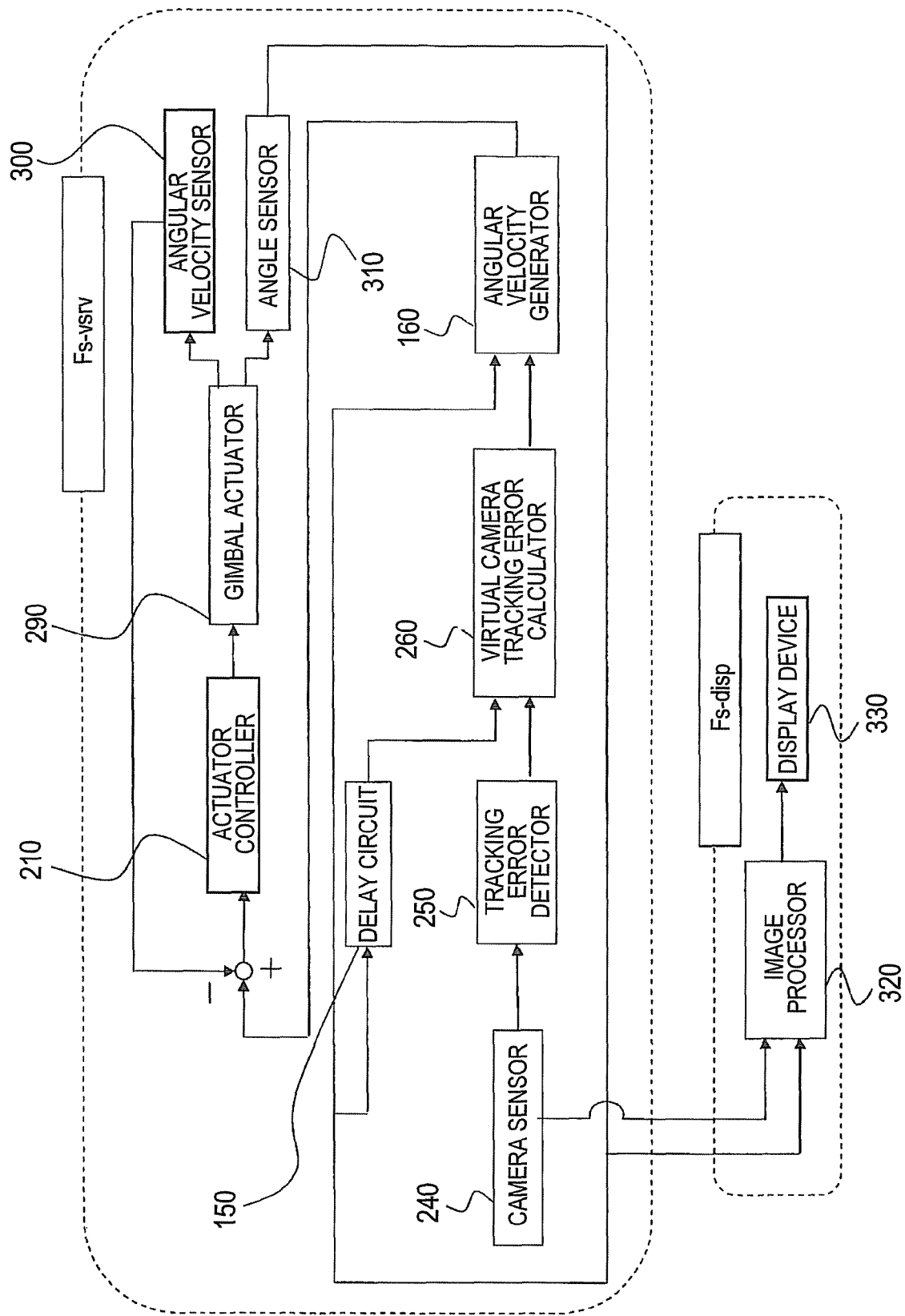
FIG. 11 shows a control operation of a mobile object image tracking apparatus according to a fourth embodiment of the invention.

FIG. 11 shows a control operation of a mobile object image tracking apparatus according to a fourth embodiment.

In the mobile object image tracking apparatus according to this embodiment, display of image data is performed together with tracking of a mobile object 280.

As described above, an image taken by the camera 100 while the mobile object 280 is tracked is affected by a rotation of the mirrors 50-90 and it takes time to process a resulting rotated image.

In view of the above, the control, involving the camera 100, of image tracking of the mobile object 280 is performed at a sampling frequency Fs-vsrv. And an image processor 320 performs image data rotation conversion using angles of the first gimbal 20 and the second gimbal 30 obtained at a sampling frequency Fs-disp that is lower than the sampling frequency Fs-vsrv of the image tracking control, and outputs the resulting image data to a display device 330. That is, an image that is processed while the image tracking control is performed is monitored on the display device 330.

As described above, in this embodiment, the rotation conversion processing is performed at a low sampling frequency. Therefore, the same image data as obtained by a conventional apparatus in which the camera 100 is fixed to the second gimbal 30 can be obtained without degrading the tracking characteristics.

It is to be understood that the invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from the configurations described as the embodiments. Further, the components described in different embodiments may be used appropriately in combination.

What is claimed is:

1. A mobile object image tracking apparatus comprising:

a base;

a first gimbal provided on the base to be rotatable with respect to the base, the first gimbal having an opening;

a second gimbal provided in the opening of the first gimbal to be rotatable with respect to the first gimbal, the second gimbal being formed with an input opening portion that receives an image of a mobile object being set as a tracking target;

an image guiding passage configured to guide the image that is received through the input opening portion of the second gimbal to the base through the second gimbal and the first gimbal;

an image capturing device provided in the base, the image capturing device being configured to capture the image guided by the image guiding passage and output image data;

an angle sensor configured to detect a first rotation angle of the first gimbal and a second rotation angle of the second gimal;

a tracking error detector configured to extract feature points from a plurality of the image data output from the image capturing device and detect a first tracking error of the image data based on the feature points;

a delay circuit configured to delay the first rotation angle and the second rotation angle and output a delayed first rotation angle and a delayed second rotation angle;

a tracking error calculator configured to calculate a second tracking error based on the first tracking error, the delayed first rotation angle, and the delayed second rotation angle;

an angular velocity processor configured to generate a first target angular velocity for the first gimbal and a second target angular velocity for the second gimbal based on the first rotation angle, the second rotation angle, and the second tracking error; and an actuator controller configured to control a first actuation of the first gimbal based on the first target angular velocity and control a second actuation of the second gimbal based on the second target angular velocity.

2. The apparatus of claim 1 further comprising:
a first actuator configured to actuate the first gimbal in accordance with the first actuation controlled by the actuator controller; and
a second actuator configured to actuate the second gimbal in accordance with the second actuation controlled by the actuator controller.

3. The apparatus of claim 1 further comprising a recorder configured to record the image data that are output from the image capturing device, the first rotation angle, and the second rotation angle.

4. The apparatus of claim 1 further comprising:
an image processor configured to perform image rotation on the image data that are output from the image capturing device based on the first rotation angle and the second rotation angle; and
a display device configured to display the image being performed with the image rotation by the image processor.

* * * * *